(12) United States Patent
Choi et al.

(10) Patent No.: US 10,397,773 B2
(45) Date of Patent: Aug. 27, 2019

(54) METHOD AND APPARATUS FOR ALLOCATING IP ADDRESS IN WIRELESS COMMUNICATION NETWORK

(71) Applicant: Samsung Electronics Co., Ltd., Suwon-si, Gyeonggi-do (KR)

(72) Inventors: Jongmu Choi, Gyeonggi-do (KR); Changsoon Kim, Gyeonggi-do (KR); Hakkwan Kim, Gyeonggi-do (KR); Namju Cho, Gyeonggi-do (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 15/870,279

(22) Filed: Jan. 12, 2018

(65) Prior Publication Data

US 2018/0139605 A1    May 17, 2018

Related U.S. Application Data

(63) Continuation of application No. 15/436,586, filed on Feb. 17, 2017, now Pat. No. 9,894,516, which is a
(Continued)

(30) Foreign Application Priority Data

Feb. 24, 2012    (KR) .................. 10-2012-0018777

(51) Int. Cl.
  *H04W 8/26*        (2009.01)
  *H04W 76/10*       (2018.01)
  (Continued)

(52) U.S. Cl.
  CPC .........  *H04W 8/265* (2013.01); *H04L 61/2007* (2013.01); *H04L 61/2038* (2013.01);
  (Continued)

(58) Field of Classification Search
  CPC . H04W 61/2038; H04W 92/18; H04W 76/02; H04W 76/021; H04W 8/005;
  (Continued)

(56) References Cited

U.S. PATENT DOCUMENTS 6,993,587 B1    1/2006  Basani et al.
7,130,612 B1    10/2006 Blewett
(Continued)

FOREIGN PATENT DOCUMENTS

CN    1929491 A1      3/2007
CN    101278522 A     10/2008
(Continued)

OTHER PUBLICATIONS

Office Action dated Oct. 27, 2016 in connection with Taiwanese Application No. 102106290, 11 pages.
(Continued)

*Primary Examiner* — Faruk Hamza
*Assistant Examiner* — Jean F Voltaire

(57) ABSTRACT

A method and apparatus allocates an IP address between terminals in a wireless communication network in which terminals directly communicate with each other in a wireless scheme without an AP. The method for allocating an Internet Protocol (IP) address of a wireless terminal capable of performing P2P communication, includes a discovery step of discovering at least one external terminal capable of performing the P2P communication and connecting with the at least one discovered external terminal by the wireless terminal; and a negotiation step of negotiating and determining with the external terminal which external terminals become a group owner and a group client in a P2P group, respectively by the wireless terminal. One of the discovery step and the negotiation step includes transmitting an IP
(Continued)

address to be allocated to the group client to the external terminal from the wireless terminal.

20 Claims, 14 Drawing Sheets

Related U.S. Application Data continuation of application No. 13/769,149, filed on Feb. 15, 2013, now Pat. No. 9,578,494.

(51) Int. Cl.

| | | |
|---|---|---|
| *H04W 4/80* | (2018.01) | |
| *H04L 29/12* | (2006.01) | |
| *H04L 29/08* | (2006.01) | |
| *H04W 4/20* | (2018.01) | |
| *H04W 84/20* | (2009.01) | |
| *H04W 4/06* | (2009.01) | |
| *H04W 48/16* | (2009.01) | |
| *H04W 4/50* | (2018.01) | |
| *H04W 76/11* | (2018.01) | |
| *H04W 92/18* | (2009.01) | |
| *H04W 84/18* | (2009.01) | |
| *H04W 8/00* | (2009.01) | |
| *H04W 80/04* | (2009.01) | |
| *H04W 76/12* | (2018.01) | |

(52) U.S. Cl.
CPC ............. *H04L 67/104* (2013.01); *H04W 4/06* (2013.01); *H04W 4/203* (2013.01); *H04W 4/50* (2018.02); *H04W 4/80* (2018.02); *H04W 48/16* (2013.01); *H04W 76/10* (2018.02); *H04W 84/20* (2013.01); *H04W 8/005* (2013.01); *H04W 8/26* (2013.01); *H04W 76/11* (2018.02); *H04W 76/12* (2018.02); *H04W 80/04* (2013.01); *H04W 84/18* (2013.01); *H04W 92/18* (2013.01)

(58) Field of Classification Search
CPC ....... H04W 8/26; H04W 8/265; H04W 4/008; H04W 4/203; H04W 84/18; H04W 84/20; H04L 61/2038; H04L 67/104
USPC ......................................................... 370/329
See application file for complete search history.

(56) References Cited

U.S. PATENT DOCUMENTS

| | | |
|---|---|---|
| 7,239,874 B2 | 7/2007 | Reddy et al. |
| 8,208,472 B2 | 6/2012 | Shin et al. |
| 8,386,603 B2 | 2/2013 | Arashin et al. |
| 2005/0004916 A1 | 1/2005 | Miller et al. |
| 2006/0126611 A1 | 6/2006 | Kelly et al. |
| 2006/0184683 A1 | 8/2006 | Bosscha et al. |
| 2006/0291434 A1 | 12/2006 | Gu et al. |
| 2007/0007668 A1 | 1/2007 | Brandenburg et al. |
| 2007/0076681 A1* | 4/2007 | Hong ................ H04L 29/12216 370/349 |
| 2007/0171910 A1 | 7/2007 | Kumar |
| 2008/0056269 A1 | 3/2008 | Madhani et al. |
| 2008/0107122 A1 | 5/2008 | Lai et al. |
| 2009/0086745 A1 | 4/2009 | Shufrun et al. |
| 2011/0026504 A1* | 2/2011 | Feinberg ................ H04W 4/08 370/338 |
| 2011/0082905 A1* | 4/2011 | Wentink ................ H04W 84/20 709/205 |
| 2011/0085529 A1 | 4/2011 | Choi et al. |
| 2011/0122835 A1 | 5/2011 | Naito et al. |
| 2011/0191468 A1 | 8/2011 | Arashin et al. |
| 2011/0191825 A1 | 8/2011 | Kageyama et al. |
| 2011/0208846 A1 | 8/2011 | Ito |
| 2011/0282989 A1 | 11/2011 | Geirhofer et al. |
| 2011/0292300 A1 | 12/2011 | Nagara et al. |
| 2011/0307617 A1 | 12/2011 | Wu et al. |

FOREIGN PATENT DOCUMENTS

| | | |
|---|---|---|
| CN | 101600156 A | 12/2009 |
| JP | 2010074610 A | 4/2010 |
| JP | 2011114377 A | 6/2011 |
| JP | 2011166194 A | 8/2011 |
| JP | 2011249960 A | 12/2011 |
| KR | 10-2011-0040025 A | 4/2011 |
| KR | 10-1085629 B1 | 11/2011 |
| TW | I330022 B | 9/2010 |
| TW | I339518 B | 3/2011 |
| WO | 2011/041735 A1 | 4/2011 |

OTHER PUBLICATIONS

Patent Examination Report No. 2 dated Oct. 27, 2015 in connection with Australian Patent Application No. 2013200928; 5 pages.
Patent Examination Report No. 1 dated Nov. 27, 2014 in connection with Australian Patent Application No. 2013200928; 7 pages.
Lin, et al.; "Adaptive Clustering for Mobile Wireless Networks"; IEEE Journal on Selected Areas in Communications; Sep. 1997; vol. 15, Issue 7; 21 pages.
Wu, et al.' "A Cluster-Head Selection and Update Algorithm for Ad Hoc Networks"; IEEE Global Telecommunications Conf (GLOBECOM); 2010; 5 pages.
Wi-Fi Alliance; WiFi Peer-to-Peer (P2P) Technical Specification; vol. 1.2; Dec. 14, 2014; 3 pages.
International Search Report dated May 31, 2013 in connection with International Patent Application No. PCT/KR2013/001276, 3 pages.
Office Action dated Jan. 24, 2017 in connection with Japanese Application No. 2013-033369, 4 pages.
Wi-Fi Alliance Technical Committee P2P Task Group, "Wi-Fi Peer-to-Peer (P2P) Technical Specification, Version 1.2", Dec. 14, 2011, 16 pages.
Wi-Fi Alliance Technical Committee P2P Task Group, "Wi-Fi Peer-to-Peer (P2P) Technical Specification, Version 1.2", Dec. 31, 2010, 159 pages.
Mansoor Mohsin et al., "IP Address Assignment in a Mobile AD Hoc Network", MILCOM 2002, Oct. 7-10, 2002, 6 pages.
Office Action dated Apr. 17, 2017 in connection with Chinese Patent Application No. 201310054731.X.
Notice of Reasons for Refusal dated Jun. 13, 2017 in connection with Japanese Patent Application No. 2013-033369.
Communication from a foreign patent office in a counterpart foreign application, The State Intellectual Property Office of P.R. China, "The Second Office Action," Chinese Application No. 201310054731.X, dated Dec. 11, 2017, 15 pages.
Office Action dated Apr. 13, 2018 in connection with Korean Patent Application No. 10-2012-0018777.
WiFi Alliance, "Wi-Fi Simple Configuration Technical Specification, Version 2.0.2", Jan. 30, 2012, 154 pages.
"WiFi Alliance Member Symposium", Jan. 1, 2011, 326 pages.
WiFi Alliance, "Wi-Fi Peer-to-Peer (P2P) Technical Specification, Version 1.14", Jun. 25, 2010, 154 pages.
European Search Report dated Feb. 12, 2019 in connection with European Patent Application No. 18 20 4467, 10 pages.

* cited by examiner

METHOD AND APPARATUS FOR ALLOCATING IP ADDRESS IN WIRELESS COMMUNICATION NETWORK

CROSS-REFERENCE TO RELATED APPLICATION(S) AND CLAIM OF PRIORITY

This application is a continuation of U.S. application Ser. No. 15/436,586, filed Feb. 17, 2017, which is a continuation of U.S. application Ser. No. 13/769,149, filed Feb. 15, 2013, now U.S. Pat. No. 9,578,494, which claims the benefit of Korean Patent Application No. 10-2012-0018777, filed on February 24, this disclosures of which are incorporated herein by reference into the present disclosure as if fully set forth herein.

TECHNICAL FIELD OF THE INVENTION

The present disclosure relates to a method and an apparatus for allocating an Internet Protocol (hereinafter referred to as 'IP') address in a wireless communication network, and more particularly, to a method for allocating an IP address between terminals in a wireless communication network in which terminals directly communicate with each other in a wireless scheme without an access point (hereinafter referred to as 'AP'), and an apparatus thereof.

BACKGROUND OF THE INVENTION

Among wireless communication technologies, a wireless fidelity (hereinafter referred to as 'Wi-Fi') direct network technology is a technology which enables Wi-Fi terminals to be connected to each other in a peer-to-peer (hereinafter referred to as 'P2P') fashion without an AP being a medium of an infrastructure network. Most of existing Wi-Fi technologies are aimed at only connecting with Internet through a Wireless Local Area Network (WLAN) AP, consideration of direct communication between terminals is insufficient. Direct communication between terminals may be achieved by a Bluetooth technology. However, performances in transmission distance and transmission speed sides of the Bluetooth technology is deteriorated as compared with the Wi-Fi Direct technology.

An existing Wi-Fi technology supports a mode in which direct communication between terminals is possible, which called an Ad-hoc mode. However, since the Ad-hoc mode is disadvantageous in that supplement is weak, power consumption is high, and throughput is limited to 11 Mbps, it is hardly used in actuality.

The Wi-Fi direct technology supports Wi-Fi Protected Access® 2 (WPA2) to supplement weakness of security. Further, the Wi-Fi Direct technology supports simple connection between terminals using a Wi-Fi Simple Configuration (hereinafter referred to as 'WSC'). Moreover, the Wi-Fi direct technology provides an improved power consumption algorithm by supporting IEEE 802.1 in to significantly improve throughput as compared with the Ad-hoc mode.

The Wi-Fi direct technology is a protocol manufactured based on IEEE 802.11, and is compatible with a legacy client. The Wi-Fi direct technology may be upgraded in a terminal without changing hardware.

Although the Wi-Fi direct technology has considerable advantages as illustrated above as compared with the Bluetooth and the Ad-hoc technology, there is a need for improvement in connection speed between terminals. The terminals perform an IP address allocation procedure after connection between the terminals is completed. That is, since the IP address allocation procedure is further performed after the connection between the terminals is completed, there is a limitation on improvement in connection speed. In particular, when one of the terminals is determined as a Group Owner (hereinafter referred to 'GO'), a corresponding terminal performs an AP function. That is, the GO drives a Dynamic Host Configuration Protocol (hereinafter referred to 'DHCP') server to allocate an IP address to another terminal, namely, a group client (hereinafter referred to 'GC').

SUMMARY OF THE INVENTION

To address the above-discussed deficiencies of the prior art, it is a primary object to provide a method for easily and rapidly allocating an IP address between terminals in a wireless communication network, and an apparatus thereof.

In accordance with an aspect of the present disclosure, a method for allocating an Internet Protocol (IP) address of a wireless terminal capable of performing P2P communication, includes: a discovery step of discovering at least one external terminal capable of performing the P2P communication and connecting with the at least one discovered external terminal by the wireless terminal; and a negotiation step of negotiating and determining with the external terminal which external terminals become a group owner and a group client in a P2P group by the wireless terminal, respectively, wherein one of the discovery step and the negotiation step includes transmitting an IP address to be allocated to the group client to the external terminal from the wireless terminal.

In accordance with another aspect of the present disclosure, an apparatus for allocating an Internet Protocol (IP) address of a wireless terminal capable of performing P2P communication, includes: a Wi-Fi module for supporting wireless communication based on an IP, and for performing a function of an access point or a station in the P2P communication; a controller for controlling the Wi-Fi module to transmit a frame for discovery of discovering external terminals and connecting with the at least one discovered external terminal by the wireless terminal, and a frame for negotiation of negotiating and determining with the external terminal which external terminals become a group owner performing a function of an access point and a group client performing a function of a station in a P2P group, respectively, and controlling the Wi-Fi module to transmit an IP address to be allocated to the group client to the external terminal during the negotiation.

Before undertaking the DETAILED DESCRIPTION OF THE INVENTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION OF THE INVENTION

FIGS. 1 through 14, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

A method and an apparatus for allocating an IP address according to exemplary embodiments of the present disclosure are described with reference to the accompanying drawings in detail. The same reference numbers are used throughout the drawings to refer to the same or like parts. Detailed descriptions of well-known functions and structures incorporated herein may be omitted to avoid obscuring the subject matter of the present disclosure.

As used herein, the term "terminal" refers to a peer to peer (P2P) device including a Wi-Fi direct technology acting as a GO and a GC in a Wi-Fi direct network. As used herein, the term "P2P group" refers to one terminal set configured by one GO and one or more GCs in the Wi-Fi direct network. The GC is connected to the GO. The GO communicates with a GC, and performs an AP function relaying communication between particularly GCS.

Figure 1:
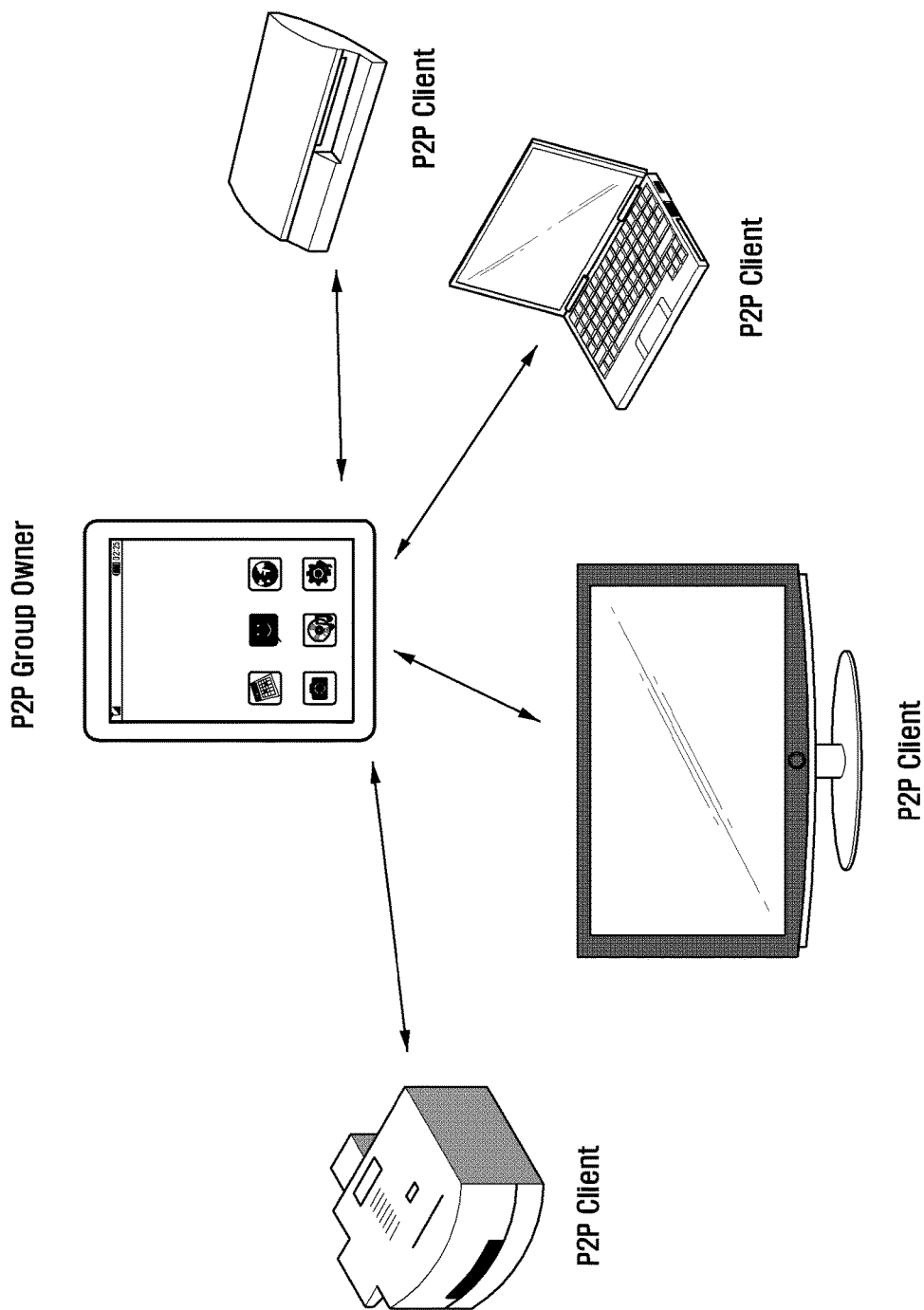
FIG. 1 illustrates a network configuration of a P2P group according to an exemplary embodiment of the present disclosure.

FIG. 1 illustrates a network configuration of a P2P group according to an exemplary embodiment of the present disclosure. Referring to FIG. 1, the GO may connect with a plurality of GCS. The GO may connect with one GC. The number of admissible clients may be determined according to a performance of the GO. Such a performance may be a hardware performance and a software performance, which may be a charging rate of a battery as an example. When a battery of the GO is charged greater than 80%, the GO may be connected with four GCs as shown. If the charging rate of the battery is less than 50%, the GO may be connected with one GC. The number of the GCs connected with the GO may be determined by the user in environment setting of the terminal. The P2P device is a terminal including the Wi-Fi direct technology and may not be variously listed. However, for example, the P2P device may be a portable terminal (e.g., tablet PC, notebook PC), a printer, a projector, and a digital TV.

Figure 2:
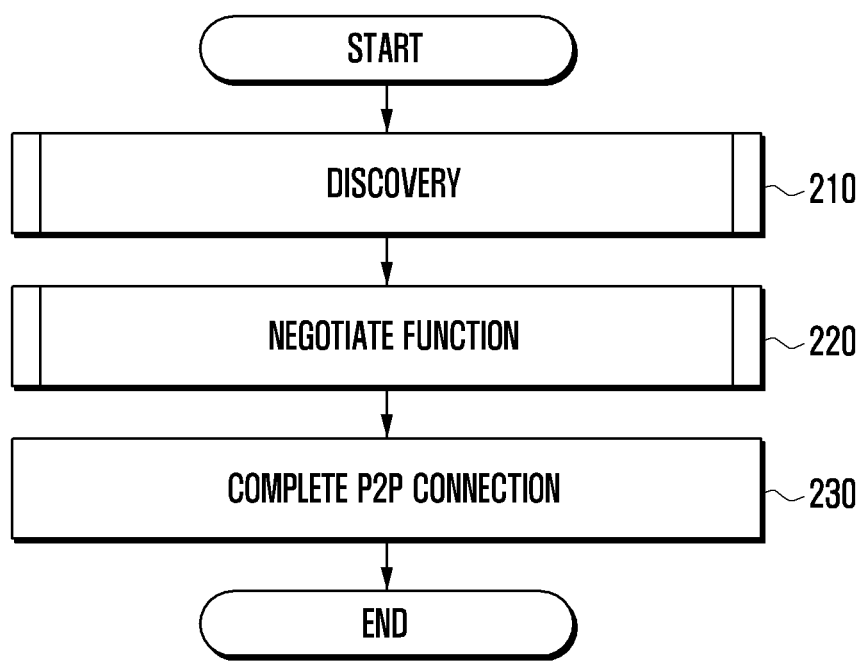
FIG. 2 illustrates a flowchart of a P2P connection method according to an exemplary embodiment of the present disclosure.

FIG. 2 illustrates a flowchart of a P2P connection method according to an exemplary embodiment of the present disclosure. Referring to FIG. 2, a P2P device discovers a neighboring P2P device, and performs connecting with the discovered P2P device (210). A purpose of the discovery is to discover P2P devices such that devices may connect with each other as soon as possible. The discovery includes a device discovery and a provision discovery. The device discovery is configured by two steps, namely, a scan step and a find step. A probe request frame and a probe response frame are used in the device discovery to exchange information between the devices. When the P2P device itself is a GO or in a listen state, the P2P device may respond to a probe request frame received from another P2P device. Further, the P2P device itself is a GO and may transmit a beacon frame. If the P2P device is not included in a group, the P2P device may be in a listen state. That is, the P2P device in the listen state responds to a received probe request frame.

The P2P device in the listen state selects a listen channel from a social channel list. For example, according to a Wi-Fi P2P Technical Specification suggested by the Wi-Fi Alliance Technical Committee, channels 1, 6, and 11 may be used as a social channel in 2.4 GHz band. For example, when channel 1 is selected, the P2P device may receive a probe request frame through the channel 1, but may not receive the probe request frame through other channels. When the device discovery starts, the listen channel may be selected and remain until the discovery is terminated. If a preset time elapses, the listen channel may be changed to another channel. A 2.4 GHz band is used and there are a total of 14 channels in the IEEE 802.11. An interval between channels is 5 MHz, each having a 22 MHz band. The channels are not independent from each other but overlap with each other. However, three channels 1, 6, and 11 among the 14 channels do not interfere with each other.

The scan step in the device discovery is a step of discovering a P2P device or a P2P group. Further, the scan step is a step of discovering the most suitable channel to set the P2P group. That is, in the scan step, the P2P device scans all supported channels to collect information from a neighboring device or network. In the scan step, the P2P device may not respond to a probe request frame.

The find step in the device discovery is a step which P2P devices existing in the same channel transceive a message to find each other. The P2P device waits for reception of the probe request frame in the listen state. When the probe request frame is received, the P2P device transmits a probe response frame to a P2P device of the other party. The P2P device may change the listen state to a discover state. In a discover state, the P2P device transmits the probe request frame and the P2P device of the other party receives the probe response frame in response to the probe request frame. The probe response frame includes a device name, device attribute information, and vendor information. The P2P device may display the information such that the user may confirm the information.

The P2P device discovered for each other through the device discovery may be connected to each other. First, the P2P device performs provision discovery with a P2P device of the other party wishing connection. When the P2P device attempts connection with a P2P device of the other party in a Personal Identification Number (PIN) or a Push Button Configuration (PBC) mode of WSC, the provision discovery informs a user of the connection attempt. The P2P device receives a provision discovery request frame for the provision discovery, and informs the user of message contents through a pop-up. The pop-up includes information of the P2P device having requested the provision discovery such as a device name. The requested use of the P2P device determines presence of admittance and a WSC of the connection. To inform the P2P device of the other party of the presence of admittance of the connection, the P2P device transmits a provision discovery response frame to the P2P device of the other party.

When the provision discovery is completed, the P2P device negotiates a function with the P2P device of the other party (220). In this procedure, a P2P device determined as the GO perform a function of the AP, and a P2P device determined as a GC perform a function of a station. In particular, in the present disclosure, in this procedure, the GC receives allocation of an IP address from the GO. The IP address may be a private IP address usable in a local area, namely, a corresponding P2P group. The P2P device stores a private IP address list. For instance, the private IP address may be "165.213.30.2~254". P2P devices in the P2P group transceives a massage to determine the GO. In this example, the message may include a private IP address. That is, the P2P device may select an optional private IP address from the private IP address list, and transmits a message including the selected private IP address to another P2P device. The P2P device determined as a GC from the P2P group sets a private IP address as the P2P device's IP address.

Negotiation of the function is completed, the P2P device exchanges information necessary for P2P communication, for example, a network key, an encryption type, a Service Set Identification (SSID), an Authentication type with the P2P device of the other party to complete P2P connection (230).

Figure 3:
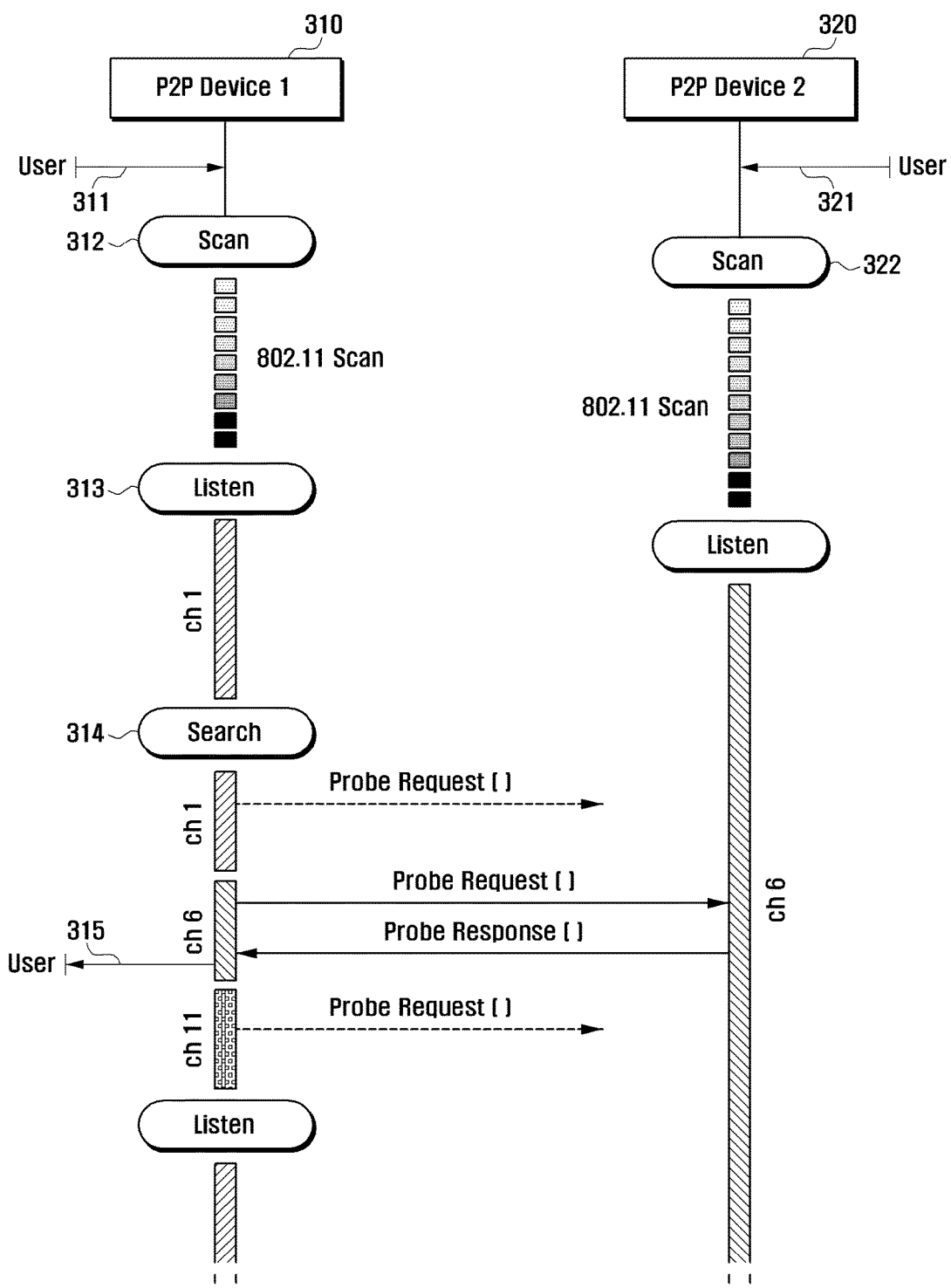
FIG. 3 illustrates a flowchart of discovery according to an exemplary embodiment of the present disclosure.

FIG. 3 illustrates a flowchart of discovery according to an exemplary embodiment of the present disclosure. Referring to FIG. 3, it is assumed that a first P2P device 310 and a second P2P device 320 participate in discovery. A user of the first P2P device 310 commands the first P2P device 310 to perform P2P connection (311). That is, the user operates an input unit included in the first P2P device 310, for example, a touch screen for P2P connection. Then, the touch screen transfers an input touch event to a controller of a device. The controller detects the P2P connection, namely, a command of device discovery from the input touch event. The first P2P device 310 firstly performs scan in response to the command of the device discovery (312). For example, the first P2P device 310 scans channels 1, 6, and 11 of IEEE 802.11 to collect information from a neighboring P2P device. After completing the scan, the first P2P device 310 performs a find step. Meanwhile, a user of the second P2P device 320 commands the second P2P device 320 to perform the discovery (321). Accordingly, the second P2P device 320 firstly performs scan in response to a command of the user (322). After completing the scan, the second P2P device 320 performs a find step.

The first P2P device 320 enters a listen state (313). The first P2P device 310 selects channel 1 as the listen channel. If a preset time elapses, the first P2P device 320 enters a discover state (314). The first P2P device 310 firstly selects channel 1 to transmit a probe request frame in the discover state. When there is no response, the first P2P device 310 selects channel 6 to transmit the probe request frame. In this example, the second P2P device 320 is in a listen state with respect to channel 6. Accordingly, the second P2P device 320 receives a probe request frame through channel 6, and transmits a probe response frame through the channel 6 in response thereto. The first P2P device 310 receives a probe response frame through the channel 6. The first P2P device 310 displays information of the probe response frame, for example, a device name, device attribute information, vendor information such that the user may confirm the foregoing information. The user may determine presence of admittance of connection based on the information.

Figure 4:
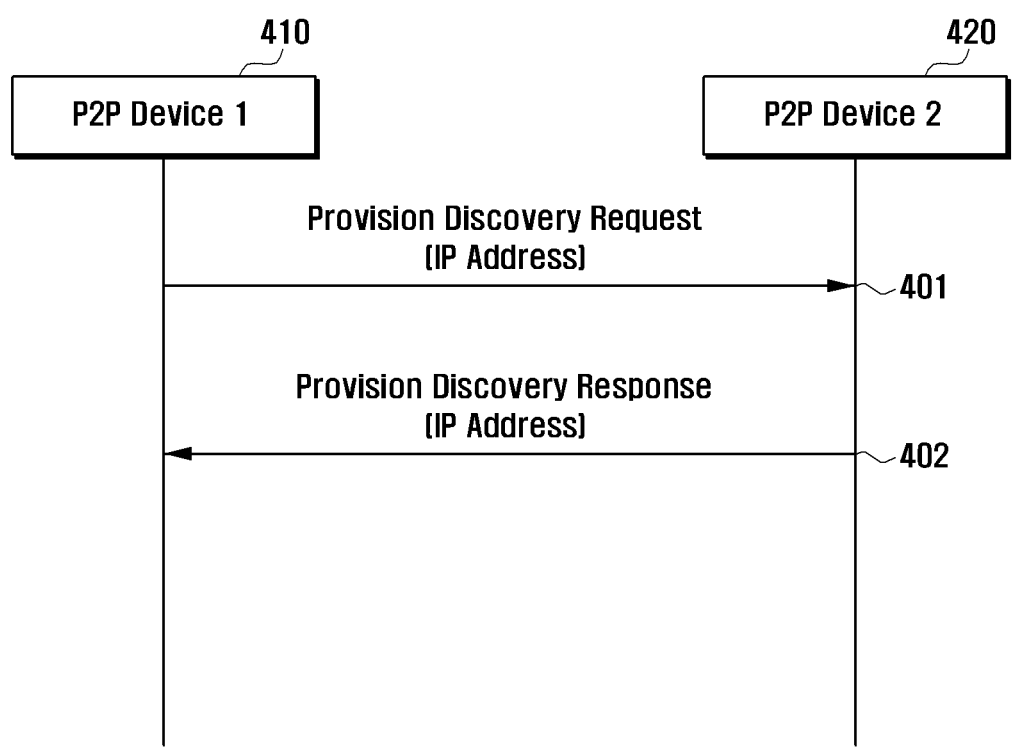
FIG. 4 illustrates a flowchart of provision discovery according to an exemplary embodiment of the present disclosure.

FIG. 4 illustrates a flowchart of provision discovery according to an exemplary embodiment of the present disclosure. Referring to FIG. 4, it is assumed that a first P2P device 410 and a second P2P device 420 participate in provision discovery. The first P2P device 410 and the second P2P device 420 discovered to each other through the device discovery may be connected to each other. A user of the first P2P device 410 commands the first P2P device 410 to admit connection. For example, the user operates an input unit included in the first P2P device 310, for example, a touch screen for P2P connection. Then, the touch screen transfers an input touch event to a controller of a device. The controller detects admittance of connection, namely, a command of device discovery from the input touch event.

The first P2P device 410 firstly transmits a provision discovery request frame to the second P2P device 420 in response to the command of the provision discovery (401). In this example, the provision discovery request frame includes an IP address. The IP address in the provision discovery request frame may be a private IP address. Particularly, the private IP address included in the provision discovery request frame may be one of "165.213.30.2~254".

The second P2P device 420 transmits a provision discovery response frame to the first P2P device 410 in response to reception of the provision discovery request frame (402). In this example, according to the present disclosure, the provision discovery response frame may include an IP address, namely, a private IP address.

Figure 5:
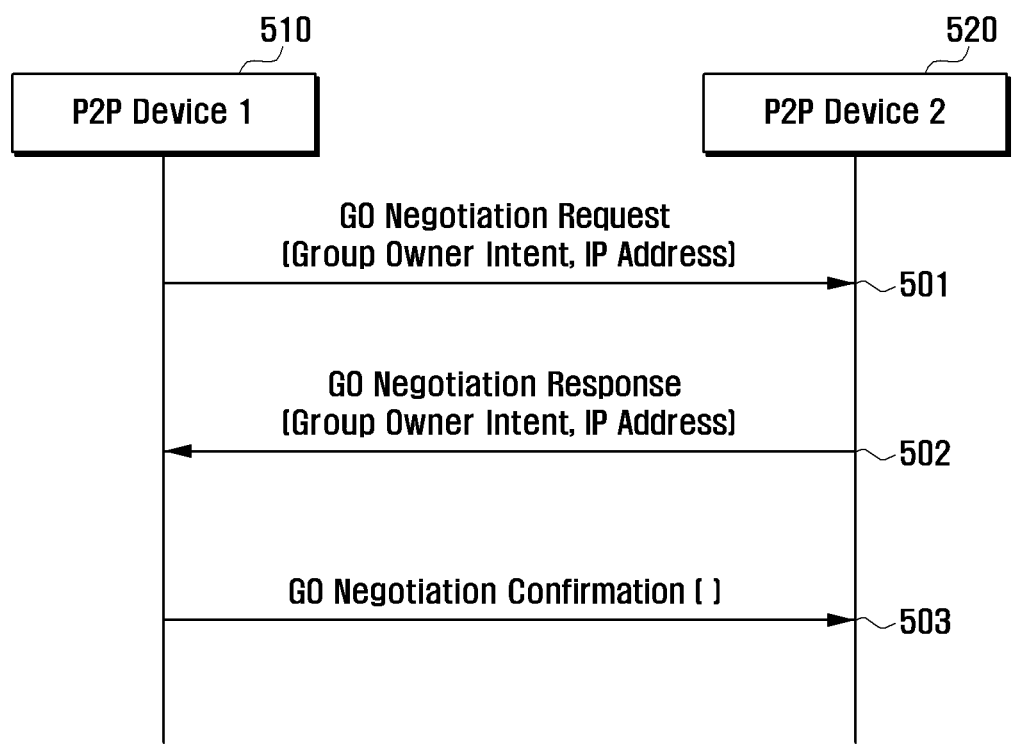
FIG. 5 illustrates a flowchart of a negotiation procedure according to an exemplary embodiment of the present disclosure.

FIG. 5 illustrates a flowchart of a negotiation procedure according to an exemplary embodiment of the present disclosure. Referring to FIG. 5, the first P2P device 510 and the second P2P device 520 are in a state which perform discovery to find each other. The first P2P device 510 transmits a GO Negotiation Request frame to the second P2P device 520 (510). According to the present disclosure, the GO negotiation request frame includes a P2P Information Element (IE), WSC information (IE), an IP address.

The IP address of the GO negotiation request frame may be private IP address. The IP address of the GO negotiation request frame may be one of "165.213.30.2~254".

That is, the first P2P device 510 may optionally select one private IP address from a private IP address list, and transmits the GO negotiation request frame including the selected private IP address. However, for example, "165.213.30.2~10" is a share to be allocated to a third P2P device, and may be excluded in the selection. Here, the third P2P device is a P2P device requesting entry to a P2P group as a P2P client after negotiation is completed. That is, a P2P device determined as the GO may allocate one of the "165.213.30.2~10" to the third P2P device.

The P2P information of the GO negotiation frame may include device information, a Configuration Timeout, a Listen Channel, a listen channel list, and a Group Owner Intent (hereinafter referred to as 'GOI'). Here, the GOI is a numeric value indicating intention of a P2P device, namely, a first P2P device 510 having transmitted a corresponding message becoming a GO. That is, when the GOI value is great, there is a great possibility which a corresponding P2P device is determined as a GO. The range of the GOI may previously be set. For example, 0~15 may be the range of the GOI. A P2P device selects a value from the GOI range based on the P2P device's performance, in a GO negotiation request frame, and transmits the GO negotiation request frame including the selected value. For example, when the P2P device receives power supply from a notebook PC and an external commercial power supply, the P2P device may select 15 as the GOI.

The second P2P device 520 receives a GO negotiation request frame from a first P2P device 510, and transmits a GO negotiation response frame in response thereto (502). According to the present disclosure, the GO negotiation response frame includes a P2P Information Element (IE), WSC information (IE), and an IP address.

As describe above, an IP address of the GO negotiation response frame may be a private IP address. Particularly, the private IP address included in the GO negotiation response frame may be one of "165.213.30.2~254". However, "165.213.30.2~10" may be omitted because of the foregoing reason. P2P information of the GO negotiation response frame may include device information, a Configuration Timeout, a Listen Channel, a listen channel list, and a GOI.

As described above, the first P2P device 510 and the second P2P device 520 exchange the GOI to determine the GO. For example, when the GOI selected by the first P2P device 510 is 10 and the GOI selected by the second P2P device 520 is 5, the first P2P device 510 is determined as the GO and the second P2P device 520 is determined as a GC. Accordingly, the first P2P device 510 performs a function of an AP in a corresponding P2P group, and the second P2P device 520 performs a function of a station in the corresponding P2P group. Further, because the first P2P device 510 is determined as the GO, the second P2P device 520 allocates an IP address received from the first P2P device 510 as the second P2P device's 520 IP address.

The first P2P device 510 transmits a GO Negotiation Confirmation Frame to the second P2P device 520 to notify that the second P2P device 520 is determined as the GC (503).

Figure 6:
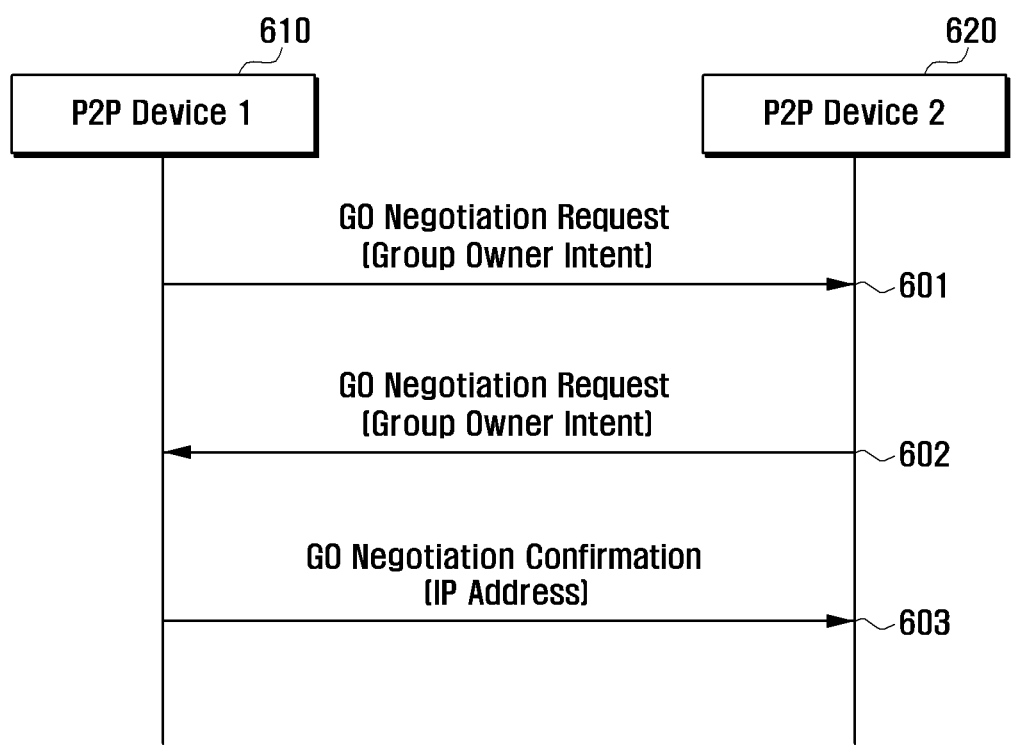
FIG. 6 illustrates a flowchart of a negotiation procedure according to another embodiment of the present disclosure.

FIG. 6 illustrates a flowchart of a negotiation procedure according to another embodiment of the present disclosure. Referring to FIG. 6, the first P2P device 610 and the second P2P device 620 are in a state which perform discovery to find each other. The first P2P device 610 transmits a GO Negotiation Request frame to the second P2P device 620 (610). According to the present disclosure, the GO negotiation request frame includes a P2P Information Element (hereinafter referred to as 'IE'), and WSC IE. The P2P information of the GO negotiation frame may include device information, a Configuration Timeout, a Listen Channel, a listen channel list, and a GOI. Here, the GOI is a numeric value indicating intention of a P2P device, namely, a first P2P device 610 having transmitted a corresponding message becoming a GO. The GOI was described above.

The second P2P device 620 receives a GO negotiation request frame from a first P2P device 610, and transmits a GO negotiation response frame in response thereto (602). According to the present disclosure, the GO negotiation response frame includes a P2P IE and a WSC IE.

As described above, the first P2P device 610 and the second P2P device 620 exchange the GOI to determine the GO. For example, the GOI selected by the first P2P device 610 is greater than that selected by the second P2P device 620, so that the first P2P device 610 may be determined as a GO. Accordingly, the first P2P device 610 performs a function of an AP in a corresponding P2P group, and the second P2P device 620 performs a function of a station in the corresponding P2P group.

The first P2P device 610 transmits a GO Negotiation Confirmation Frame the second P2P device 620 to notify that the second P2P device 520 is determined as the GC (603). In particular, according to the present disclosure, the GO Negotiation Confirmation Frame may include an IP address. Here, as described above, the IP address may be a private IP address. The second P2P device 620 allocates an IP address received from the first P2P device 610 determined as the GO as the second P2P device's 520 IP address.

Figure 8:
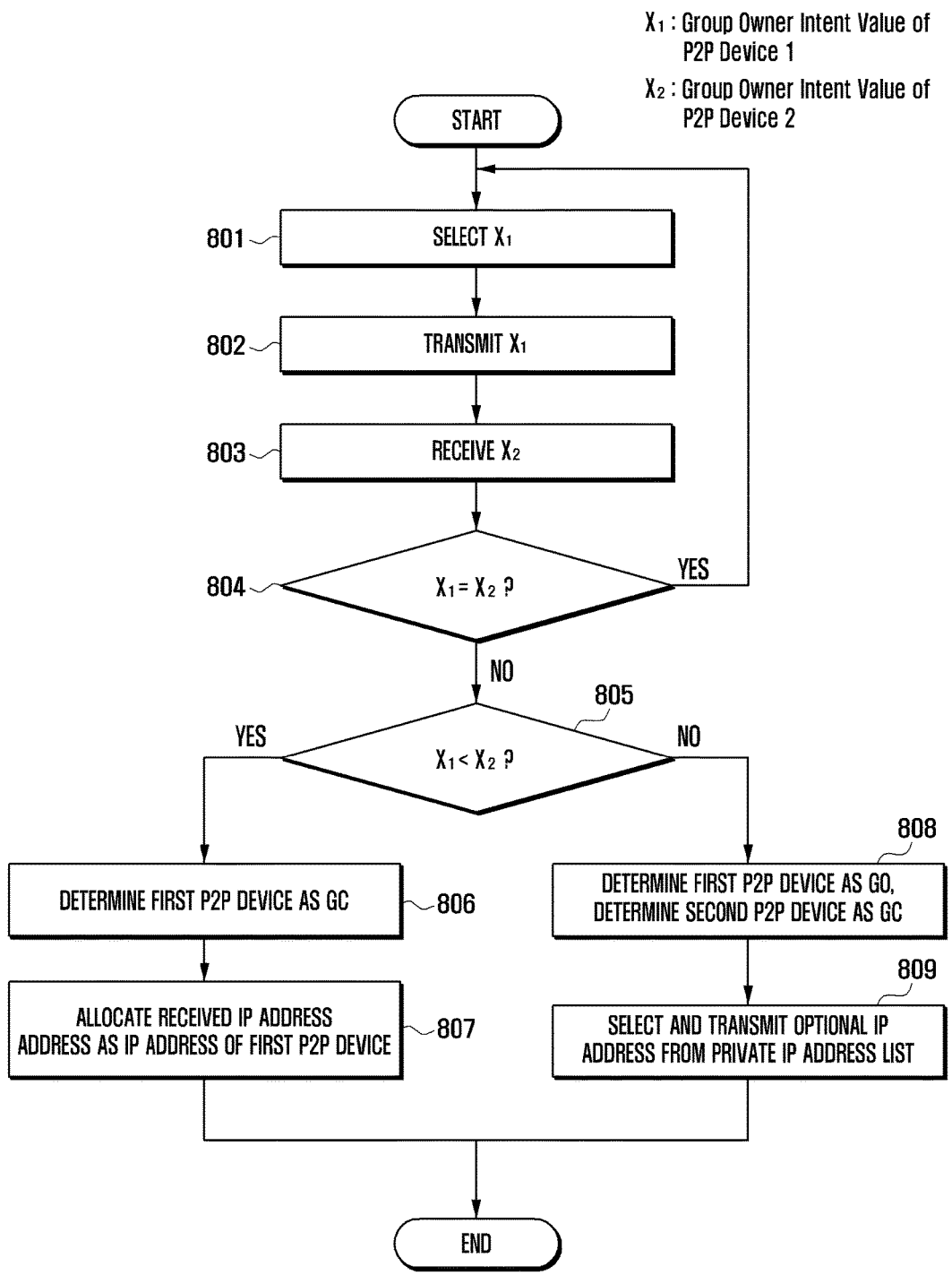
FIG. 8 illustrates a flowchart of a method for allocating an IP according to a second embodiment of the present disclosure.
Figure 9:
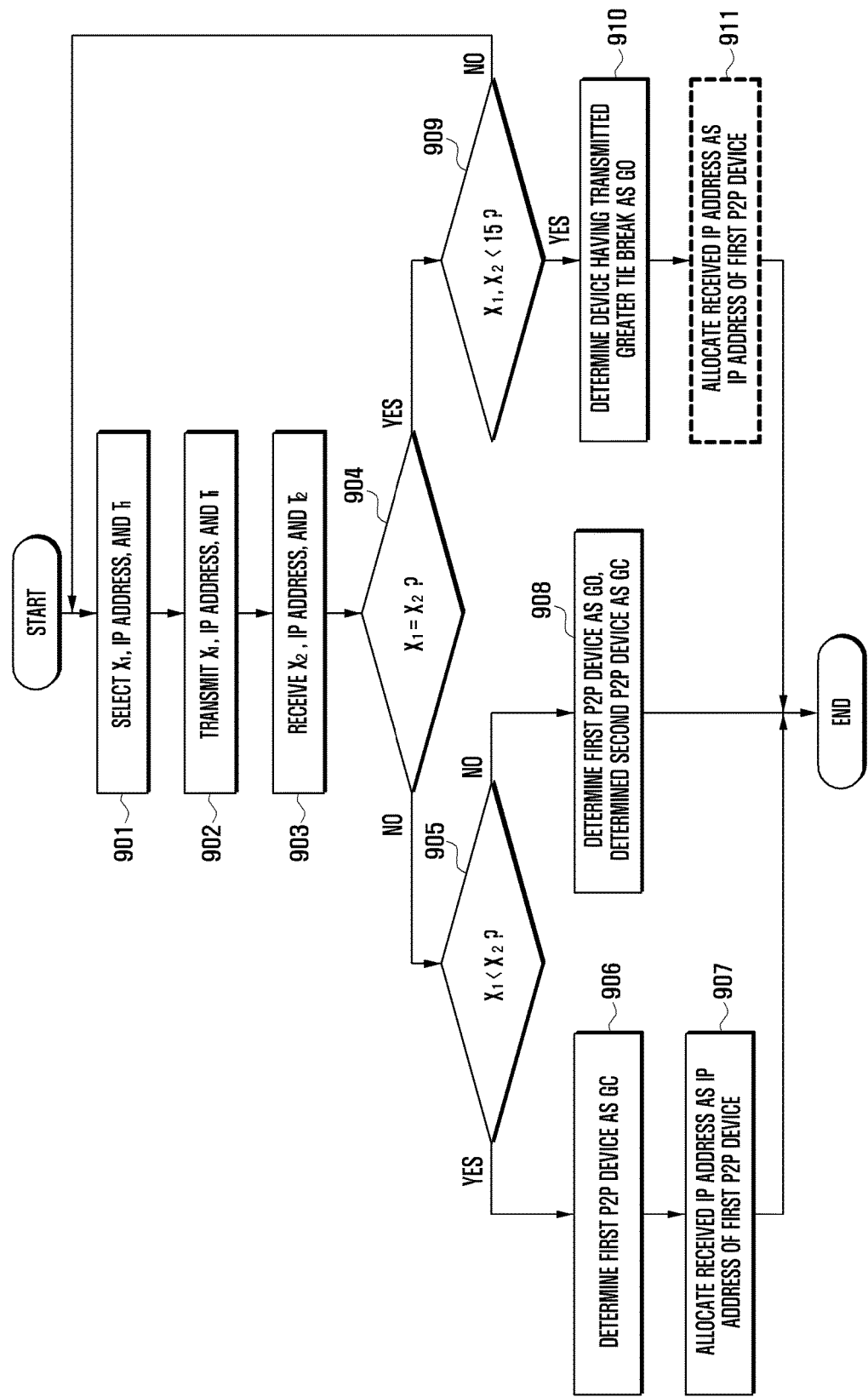
FIG. 9 illustrates a flowchart of a method for allocating an IP according to a third embodiment of the present disclosure.

Hereinafter, various embodiments of a method for allocating an IP according to the present disclosure will be described with reference to FIGS. 7 to 13. It is apparent that a method for allocating an IP address according to the present disclosure is not limited to following embodiments. Prior to the description, for convenience of the description, P2P devices participating in negotiation are limited to a first P2P device and a second P2P device. It is apparent that a main body of the description in FIGS. 7 to 9 is a first P2P device.

Figure 7:
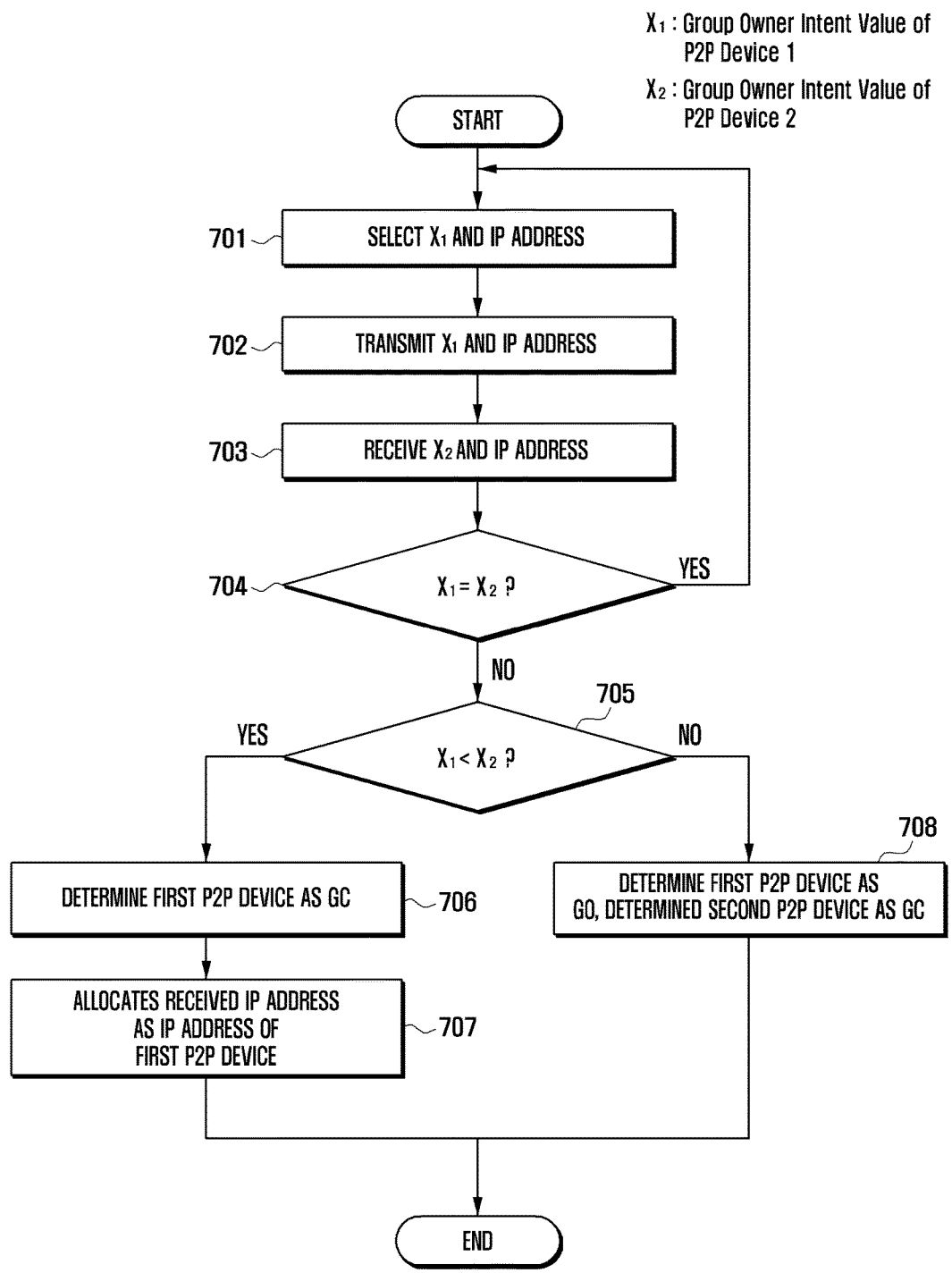
FIG. 7 illustrates a flowchart of a method for allocating an IP according to a first embodiment of the present disclosure.

FIG. 7 illustrates a flowchart of a method for allocating an IP according to a first embodiment of the present disclosure. Referring to FIG. 7, a first P2P device selects a GOI value $X_1$ from a preset GOI range (e.g., 0~15) (701). Further, the first P2P device selects an optional IP address from a private IP address list (701). The first P2P device transmits the selected GOI value $X_1$ and IP address to the second P2P device (702). In this example, the $X_1$ and IP address may be transmitted to be included in a GO negotiation request frame or a GO negotiation response frame. The first P2P device receives a GOI value $X_2$ and an IP address from the second P2P device (703). Here, the GOI value $X_2$ and IP address are already received, step 703 is omitted.

The first P2P device determines whether the received GOI value $X_2$ is identical with the transmitted GOI value $X_1$ (704). When the received GOI value $X_2$ is identical with the transmitted GOI value $X_1$, negotiation fails. Accordingly, the first P2P device and the second P2P device may again exchange the GOI value. In this example, the IP address may be again exchanged or not.

When the received GOI value $X_2$ differs from the transmitted GOI value $X_1$, the first P2P determines whether the received GOI value $X_2$ is greater than the transmitted GOI value $X_1$ (705). When the received GOI value $X_2$ is greater the transmitted GOI value $X_1$, the first P2P device determines itself as a GC (706). The first P2P device allocates the received IP address as the first P2P device's IP address (707). Accordingly, the first P2P device may perform a function of the station. In the meantime, the second P2P device determines itself as a GO. Accordingly, the second P2P device may perform a function of an AP. When the received GOI value $X_2$ is less than the transmitted GOI value $X_1$, the first P2P device determines itself as a GO (708). Further, the second P2P device determines itself as a GC.

FIG. 8 illustrates a flowchart of a method for allocating an IP according to a second embodiment of the present disclosure. Referring to FIG. 8, a first P2P device selects a GOI value $X_1$ from a preset GOI range (e.g., 0~15) (801). The first P2P device transmits the selected GOI value $X_1$ to the second P2P device (802). In this example, the $X_1$ may be transmitted to be included in a GO owner negotiation request frame or a GO negotiation response frame. The first P2P device receives a GOI value $X_2$ from the second P2P device (803). Here, the GOI value $X_2$ is already received, step 803 is omitted.

The first P2P device determines whether the received GOI value $X_2$ is identical with the transmitted GOI value $X_1$ (804). When the received GOI value $X_2$ is identical with the transmitted GOI value $X_1$, negotiation fails. Accordingly, the first P2P device and the second P2P device may again exchange the GOI value.

When the received GOI value $X_2$ differs from the transmitted GOI value $X_1$, the first P2P device determines whether the received GOI value $X_2$ is greater than the transmitted GOI value $X_1$ (805). When the received GOI value $X_2$ is greater the transmitted GOI value $X_1$, the first P2P device determines itself as a GC (806). After that, the first P2P device receives an IP address from the second P2P device, and allocates the received IP address as the first P2P device's IP address (807). The IP address may be received to be included in the GO negotiation confirmation frame.

When the received GOI value $X_2$ is less than the transmitted GOI value $X_1$, the first P2P device determines itself as a GO (808). The first P2P device selects an optional IP address from a private IP address list, and transmits the selected IP address to the second P2P device (809).

FIG. 9 illustrates a flowchart of a method for allocating an IP according to a third embodiment of the present disclosure. Referring to FIG. 9, a first P2P device selects a GOI value $X_1$ from a preset GOI range (e.g., 0~15) (901). Further, the first P2P device selects an optional IP address from a private IP address list (901). In addition, the first P2P device selects a tie break value $T_1$ (901). Here, the tie break is a value used to determine a GO when GOI values collide (are identical) with each other. The tie break value may be in an ascending or descending sequence in a preset range. For example, when the first P2P device preempts '0' as the tie break value, the second P2P device may select '1' being a next value as the tie break value.

The first P2P device transmits the selected GOI value $X_1$, tie break value $T_1$, and IP address to the second P2P device (902). In this example, the $X_1$, $T_1$, and IP address may be transmitted to be included in a GO negotiation request frame or a GO negotiation response frame. In this example, the $T_1$ may not be transmitted to be included in a GO negotiation request frame or a GO negotiation response frame. That is, the tie break value may not be exchanged between two P2P devices. In other words, because a P2P device of the two P2P devices having transmitted a request frame preempts the tie break value, exchange of the tie break value may not be necessary.

The first P2P device receives a GOI value $X_2$, a tie break value $T_2$, and an IP address from the second P2P device (903). Here, the GOI value $X_2$, tie break value $T_2$, and IP address are already received, step 903 is omitted. A tie break value $T_2$ may not be received.

The first P2P device determines whether the received GOI value $X_2$ is identical with the transmitted GOI value $X_1$ (904). When the received GOI value $X_2$ differs from the transmitted GOI value $X_1$, the first P2P determines whether the received GOI value $X_2$ is greater than the transmitted GOI value $X_1$ (905). When the received GOI value $X_2$ is greater the transmitted GOI value $X_1$, the first P2P device determines itself as a GC (906). Further, the second P2P device determines itself as a GO. The first P2P device allocates a received IP address as the first P2P device's IP address (907).

When the received GOI value $X_2$ is less than the transmitted GOI value $X_1$, the first P2P device determines itself as a GO (908). Further, the second P2P device determines itself as a GC.

When the received GOI value X2 is identical with the transmitted GOI value X1, the first P2P device determines whether the X1 and X2 are less than 15 (here, 15 is a maximum value of the GOI range) (909). When the X1 and X2 are 15, exchange of the GOI value may be again performed. Although both of the X1 and X2 are 15, the process may go to step 910. That is, step 909 may be omitted.

When both of the $X_1$ and $X_2$ are less than 15, the first P2P device compares the $T_2$ with the $T_1$, and determines a function thereof based on the comparison result (910). That is, when the $T_1$ is greater than $T_2$, the first and second P2P devices may be determined as a GO and a GC, respectively. Conversely, when the first and second P2P devices may be determined as a GC and a GO, respectively.

When the first P2P2 device is determined as the GC through the comparison result of the $T_2$ with the $T_1$, the first P2P device allocates the received IP address as the first P2P device's IP address (911). When the first P2P device is determined as the GO, step 911 is omitted.

Figure 10:
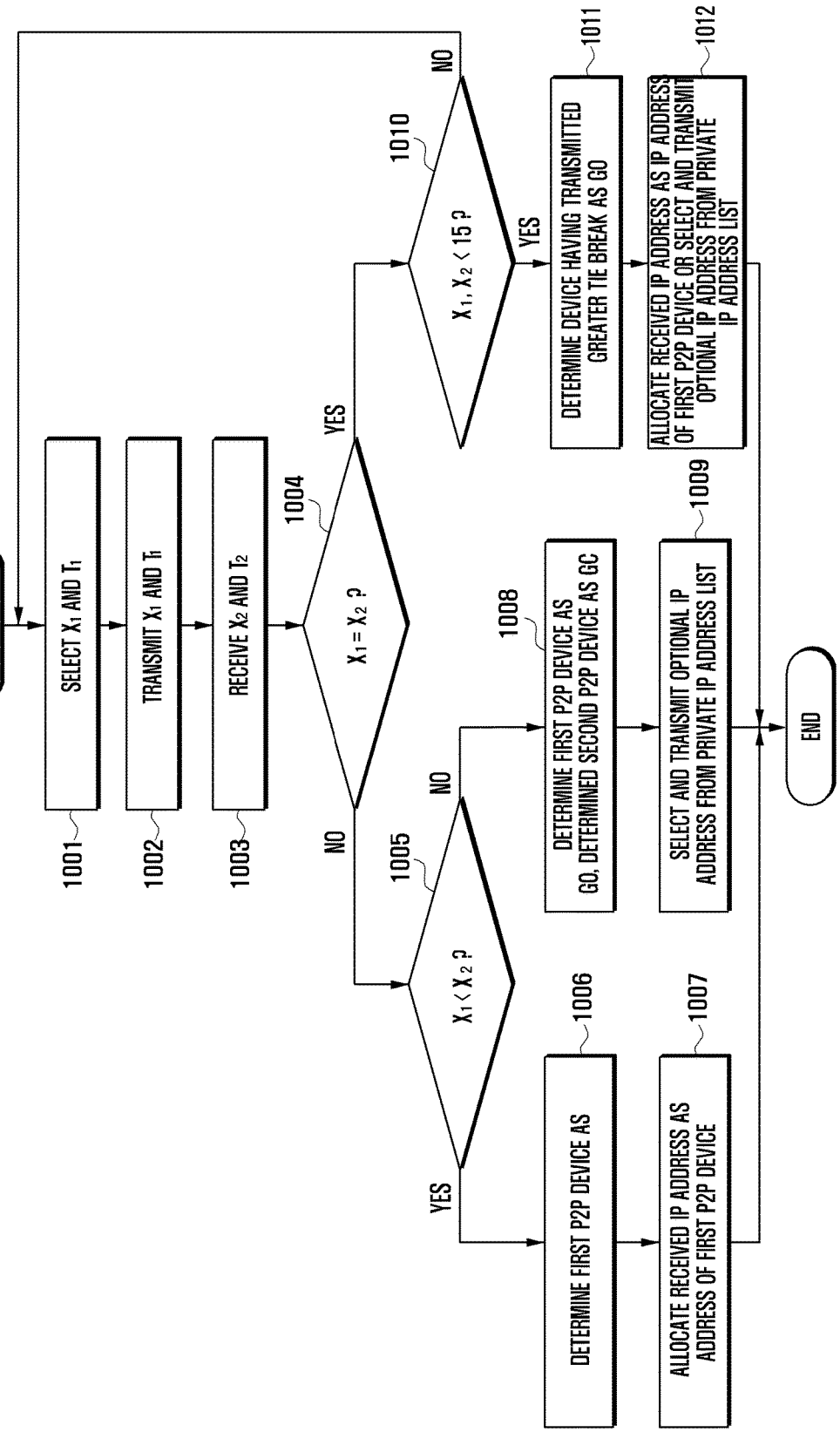
FIG. 10 illustrates a flowchart of a method for allocating an IP according to a fourth embodiment of the present disclosure.

FIG. 10 illustrates a flowchart of a method for allocating an IP according to a fourth embodiment of the present disclosure. Referring to FIG. 10, a first P2P device selects a GOI value $X_1$ from a preset GOI range (e.g., 0~15) (1001). Further, the first P2P device selects a tie break value $T_1$ (1001). The tie break value may be in an ascending or descending sequence in a preset range.

The first P2P device transmits the selected GOI value $X_1$ and tie break value $T_1$ to the second P2P device (1002). In this example, the $X_1$ and $T_1$ may be transmitted to be included in a GO negotiation request frame or a GO negotiation response frame. In this example, the $T_1$ may not be transmitted to be included in a GO negotiation request frame or a GO negotiation response frame. That is, the tie break value may not be exchanged between two P2P devices.

The first P2P device receives a GOI value $X_2$ and a tie break value $T_2$ from the second P2P device (1003). Here, the GOI value $X_2$ and the tie break value $T_2$ are already received, step 1003 is omitted. A tie break value $T_2$ may not be received.

The first P2P device determines whether the received GOI value $X_2$ is identical with the transmitted GOI value $X_1$ (1004). When the received GOI value $X_2$ differs from the transmitted GOI value $X_1$, the first P2P determines whether the received GOI value $X_2$ is greater than the transmitted GOI value $X_1$ (1005). When the received GOI value $X_2$ is greater the transmitted GOI value $X_1$, the first P2P device determines itself as a GC (1006). Further, the second P2P device determines itself as a GO. The first P2P device receives an IP address from the second P2P device and allocates a received IP address as the first P2P device's IP address (1007). The IP may be received to be included in a GO negotiation confirmation frame.

When the received GOI value $X_2$ is less than the transmitted GOI value $X_1$, the first P2P device determines itself as a GO (1008). Further, the second P2P device determines itself as a GC. Further, the first P2P device selects an optional IP address from a private IP address list and transmits the selected IP address to the second P2P device (1009).

When the received GOI value $X_2$ is identical with the transmitted GOI value $X_1$, the first P2P device determines whether the $X_1$ and $X_2$ are less than 15 (here, 15 is a maximum value of the GOI range) (1010). When the $X_1$ and $X_2$ are 15, exchange of the GOI value may be again performed. Although both of the $X_1$ and $X_2$ are 15, the process may go to step 1011. That is, step 1010 may be omitted.

When both of the $X_1$ and $X_2$ are less than 15, the first P2P device compares the $T_2$ with the $T_1$, and determines a function thereof based on the comparison result (1011). That is, when the $T_1$ is greater than $T_2$, the first and second P2P devices may be determined as a GO and a GC, respectively. Conversely, when the first and second P2P devices may be determined as a GC and a GO, respectively.

When the first P2P2 device is determined as the GC through the comparison result of the $T_2$ with the $T_1$, the first P2P device allocates the received IP address as the first P2P device's IP address (1012). Meanwhile, when the first P2P device is determined as the GO, the first P2P device selects an optional IP address from a private IP address list and transmits the selected optional IP address to the second P2P device (1012).

Figure 11:
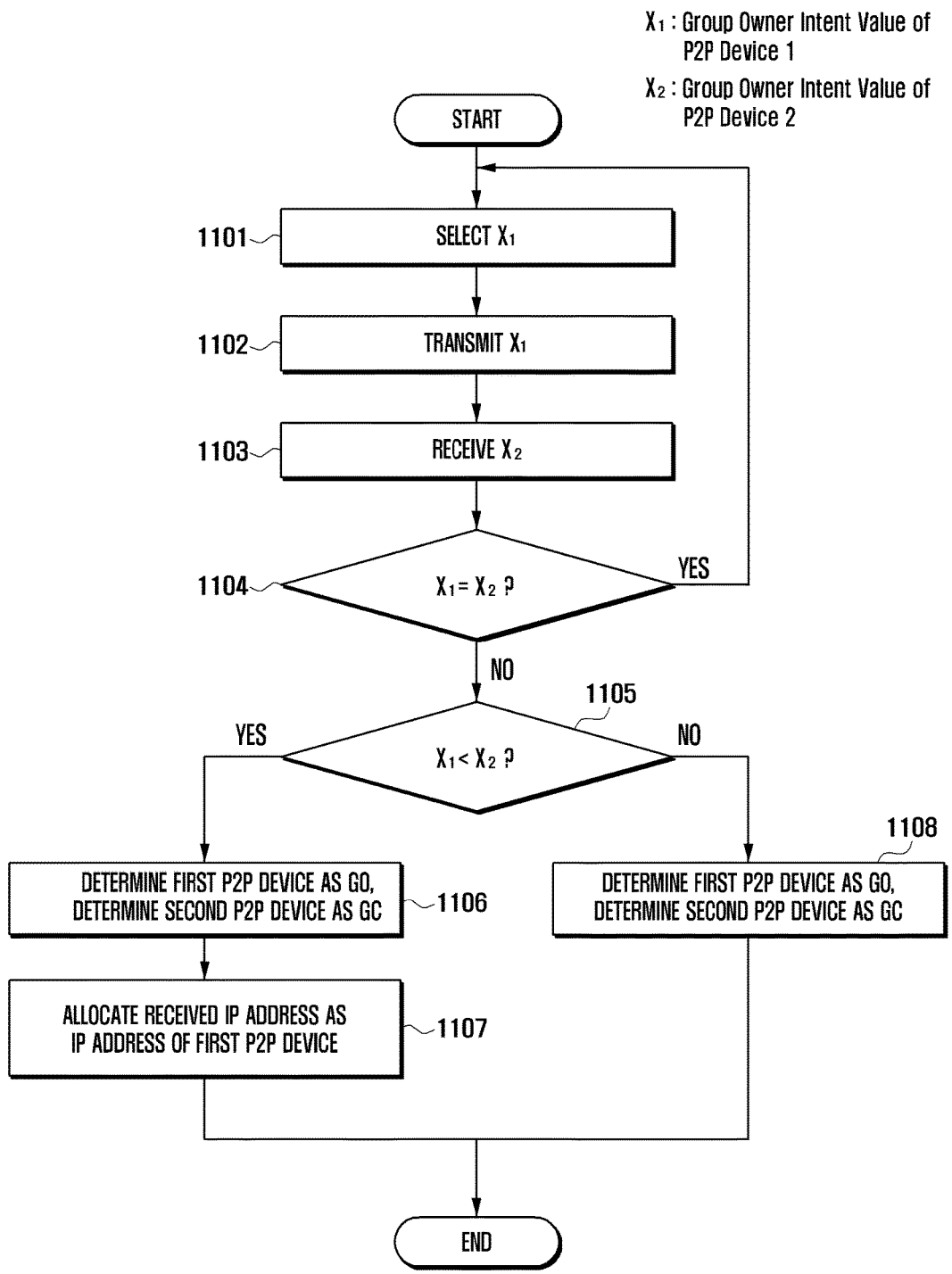
FIG. 11 illustrates a flowchart of a method for allocating an IP according to a fifth embodiment of the present disclosure.

FIG. 11 illustrates a flowchart of a method for allocating an IP according to a fifth embodiment of the present disclosure. Referring to FIG. 11, a first P2P device selects a GOI value $X_1$ from a preset GOI range (e.g., 0~15) (1101). The first P2P device transmits the selected GOI value $X_1$ to the second P2P device (1102). In this example, the $X_1$ may be transmitted to be included in a GO negotiation request frame or a GO negotiation response frame. The first P2P device receives a GOI value $X_2$ from the second P2P device (1103). Here, the GOI value $X_2$ is already received, step 1103 is omitted.

The first P2P device determines whether the received GOI value $X_2$ is identical with the transmitted GOI value $X_1$ (1104). When the received GOI value $X_2$ is identical with the transmitted GOI value $X_1$, the first P2P device and the second P2P device may again exchange the GOI value.

When the received GOI value $X_2$ differs from the transmitted GOI value $X_1$, the first P2P determines whether the received GOI value $X_2$ is greater than the transmitted GOI value $X_1$ (1105). When the received GOI value $X_2$ is greater the transmitted GOI value $X_1$, the first P2P device determines itself as a GC (1106). After that, the first P2P device receives an IP address from the second P2P device, and allocates the received IP address as the first P2P device's IP address (1107). Here, the IP address is received from the second P2P device through provision discovery. Meanwhile, the second P2P device determines itself as a GO.

When the received GOI value $X_2$ is less than or equal to the transmitted GOI value $X_1$, the first P2P device determines itself as a GO (1108). Further, the second P2P device determines itself as a GC.

Figure 12:
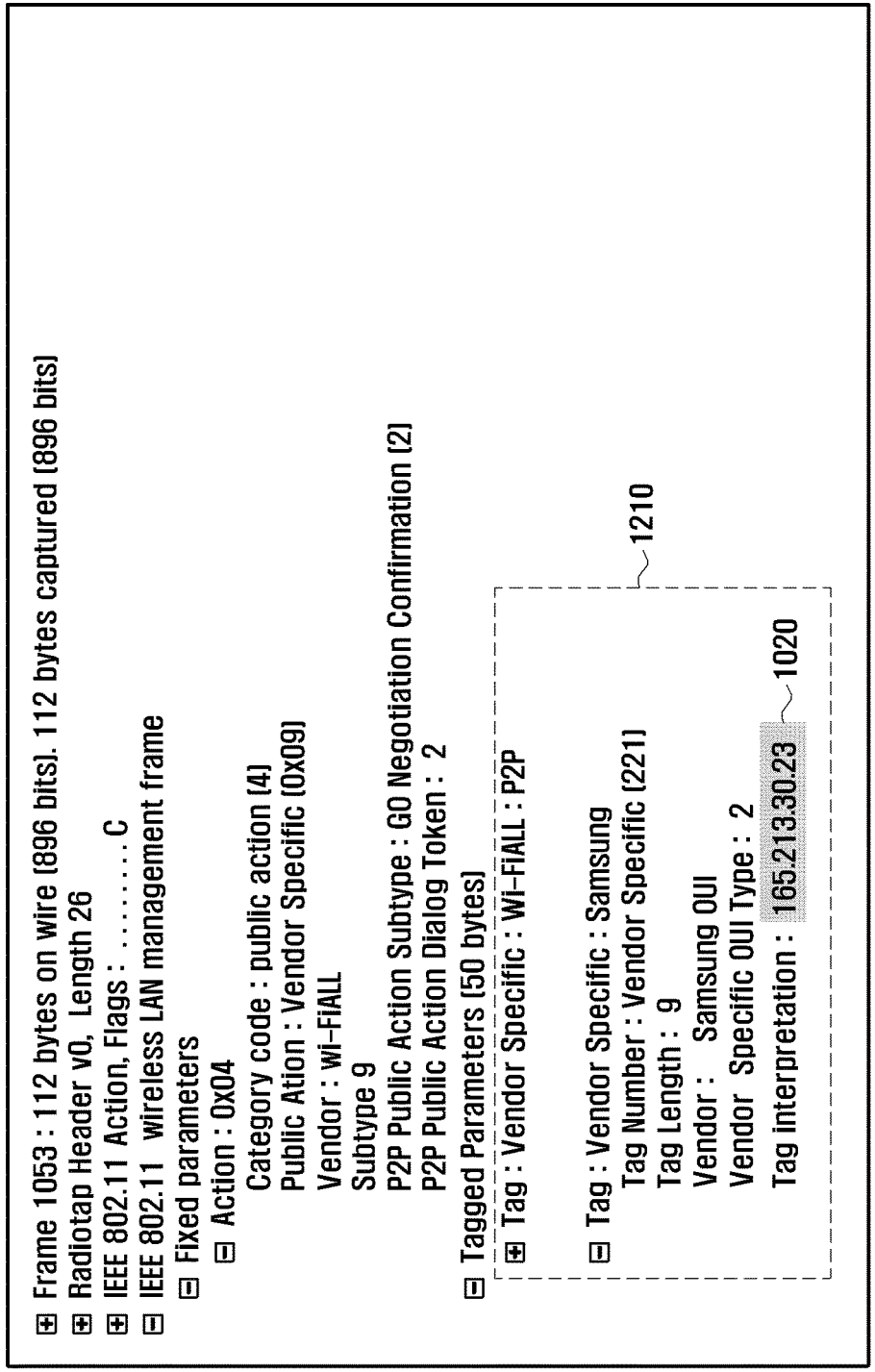
FIG. 12 illustrates a diagram of an example of a GO Negotiation Confirmation frame according to an exemplary embodiment of the present disclosure.

FIG. 12 illustrates a diagram of an example of a GO Negotiation Confirmation frame according to an exemplary embodiment of the present disclosure. Referring to FIG. 12, a GO negotiation confirmation frame may include a vendor specific 1210. Further, the vendor specific 1210 may include a private IP address 1020, for instance, "165.213.30.23". That is, the P2P device may select one from "165.213.30.2~254" and includes the selected IP address in a GO negotiation confirmation frame, and transmit the GO negotiation confirmation frame to a P2P device of the other party. The P2P device may include the selected IP address in a GO negotiation request frame or a GO owner negotiation response frame, and the corresponding to the P2P device of the other party. For example, "165.213.30.2~10" is a share to be allocated to a third P2P device, and may be excluded in the selection.

Figure 13:
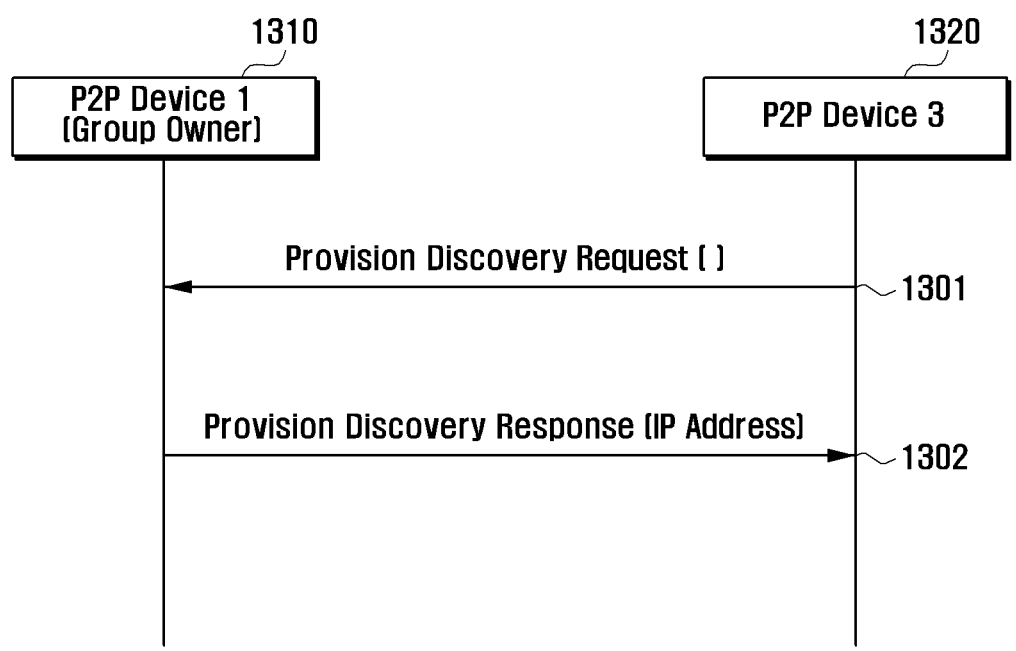
FIG. 13 illustrates a flowchart of a method for allocating an IP according to a sixth embodiment of the present disclosure.

FIG. 13 illustrates a flowchart of a method for allocating an IP according to a sixth embodiment of the present disclosure. Referring to FIG. 13, a first P2P device 1310 is in a state completing connection with a second P2P device (not shown) through discovery and negotiation procedures. Further, the first P2P device 1310 is in a state determined as a GO in the negotiation procedure. Further, the first P2P device 1310 and a third P2P device 1320 are in a state discovered through the device discovery. The third P2P device 1320 transmits a provision discovery request frame to the first P2P device 1310 in this state (1301). The first P2P device 1310 transmits a provision discovery response frame to the third P2P device 1320 in response to reception of the provision discovery request frame (1302). In this example, according to the present disclosure, the provision discovery response frame may include an IP address, particularly, a private IP address. The third P2P device 1320 allocates the received IP address as the third P2P device's IP address and participates in a P2P group in which the first P2P device 1310 is a GO.

As described above, the P2P device according to the present disclosure is applicable of electronic device in the various forms. In particular, the P2P device of the present disclosure is applicable to a portable terminal. It will be apparent that the portable terminal is applicable to various information and communication devices and multi-media device such as a portable phone, a smart phone, a tablet PC, a net book PC, a notebook PC, a Portable Multimedia Player (PMP), an electronic book (e-book) reader, a Personal Digital Assistant (PDA), a digital broadcasting player, a music player (e.g., MP3 player), a portable game terminal, and application devices thereof.

Figure 14:
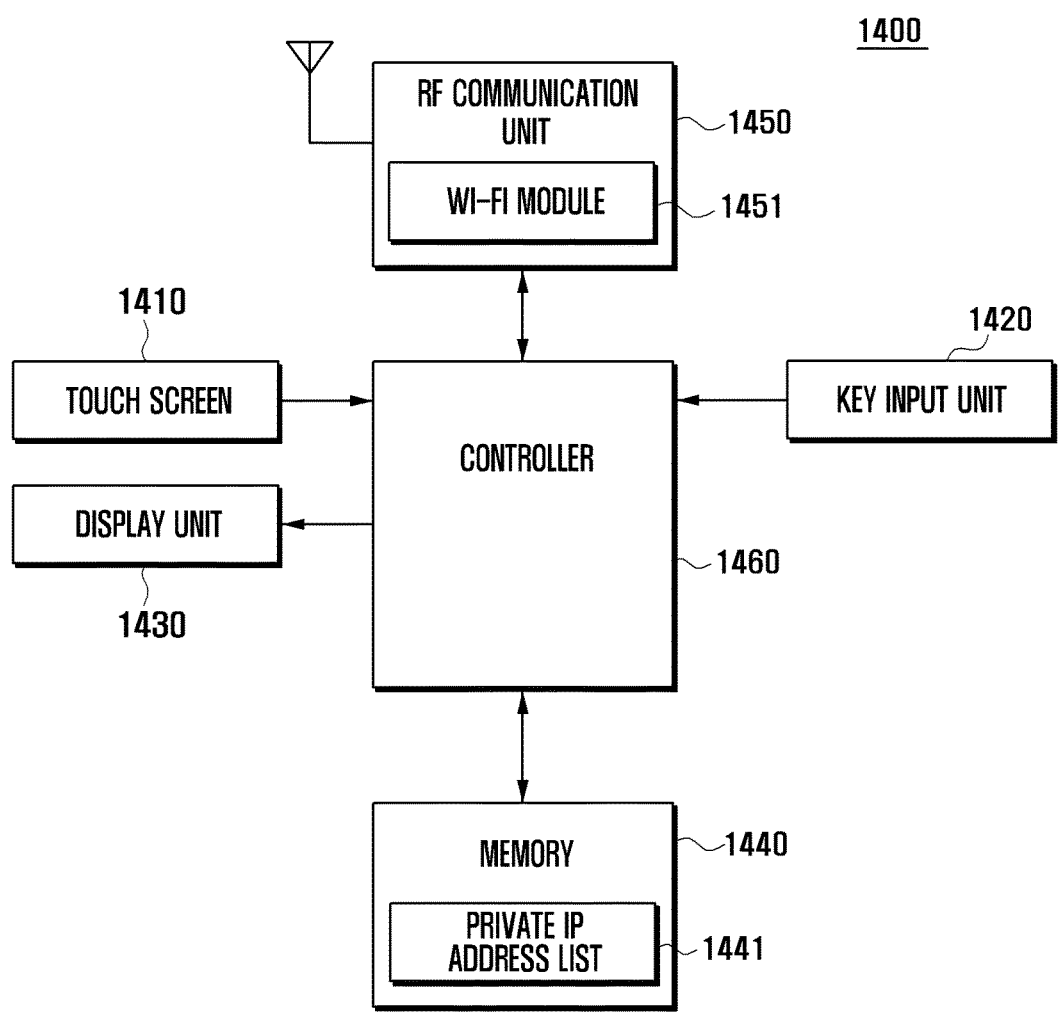
FIG. 14 illustrates a block diagram of a configuration of a portable terminal according to an exemplary embodiment of the present disclosure.

FIG. 14 illustrates a block diagram of a portable terminal according to an exemplary embodiment of the present disclosure. Referring to FIG. 14, a portable terminal 1400 according to the present disclosure may include a touch screen 1410, a key input unit 1420, a display unit 1430, a memory 1440, a radio frequency (RF) communication unit 1450, and a controller 1460.

The touch screen 1410 is mounted in front of the display unit 1430, generates a touch event in response to a user gesture input to the touch screen 1410, and transfers the generated touch event to the controller 1460. Accordingly, the controller 1460 may detect the touch event input from the touch screen 1410 to control the foregoing components.

The key input unit 1420 may include a plurality of input keys and function keys for receiving input of numerals and character information and for setting various functions. The key input unit 1420 generates and transfers a key signal associated with user setting and function control of the portable terminal 1400 to the controller 1460. The controller 1460 controls the foregoing components in response to the key signal.

The display unit 1430 converts image data input from the controller 1460 into an analog signal, and displays the analog signal under control of the controller 1460. That is, the display unit 1430 may provide various screens according to use of the portable terminal, for example, a lock screen, a home screen, an application execution screen, a menu screen, a keypad screen a message creation screen, and an Internet screen. The display unit 1430 may be configured by a flat panel display such as a Liquid Crystal Display (LCD), an Organic Light Emitted Diode (OLED), or an Active Matrix Organic Light Emitted Diode (AMOLED).

The memory 1440 may store an operating system (OS), applications necessary for the disclosure, and various data. The memory 1440 may chiefly include a program area and a data area. The data area of the memory 140 may store data generated by the portable terminal 1400 or data downloaded from the outside, namely, images, documents, video, messages, mails, music, and effect sounds. Further, the data area may store the screen displayed on the display unit 1430. Moreover, the data area may temporarily store data which the user copies messages, photographs, web pages, or documents for copy and paste. In addition, the data area may store various setting values (e.g., screen brightness, presence of vibration when a touch occurs, presence of automatic rotation of a screen) for operating the portable terminal. Further, the data area may include a private IP address list 1441. The program area of the memory 1440 may store an operating system (OS) for booting the portable terminal and the foregoing components, and various applications. In particular, the program area stores programs associated with an operation and control of a Wi-Fi direct terminal such as device discovery, provision discovery, and negotiation.

The RF communication unit 1450 performs a voice call, an image call or data communication under control of the controller 1460. To do this, the RF communication unit 1450 may include an RF transmitter up-converting a frequency of a transmitted signal and amplifying the signal and an RF receiver low-noise-amplifying a received signal and down-converting the signal. Further, the RF communication unit 1450 may include mobile communication modules (e.g., a 3-Generation mobile communication module, a 3.5-Generation mobile communication module, or a 4-Generation mobile communication module, etc.) and a Wi-Fi module.

The Wi-Fi module 1451 supports wireless communication based on an IP of the portable terminal 1400. In the present disclosure, the Wi-Fi module 1451 performs a function of an AP or a station under control of the controller 1460. In other words, the Wi-Fi module 1451 acts as a GO or a GC under control of the controller 1460.

The Wi-Fi module 1451 performs device discovery, provision discovery, and negotiation. Particularly, the Wi-Fi module 1451 may include an IP address in a Provision Discovery Request Frame, a Provision Discovery Response Frame, a GO Negotiation Request Frame, a GO Negotiation Response Frame, or a GO Negotiation Configuration Frame, and transmit the corresponding frame under control of the controller 1460. Further, the Wi-Fi module 1451 may receive the IP address included in the Provision Discovery Request Frame, the Provision Discovery Response Frame, the GO Negotiation Request Frame, the GO Negotiation Response Frame, or the GO Negotiation Configuration Frame, and transfer the received IP address to the controller 1460.

The controller 1460 controls an overall operation of the portable terminal 1400, signal flow between internal components of the portable terminal 1400, and processes data. Further, the controller 1460 controls power supply to the internal components in a battery. Moreover, the controller 1460 executes various applications stored in the program area.

The controller 1460 may receive an event from the touch screen 1410 or the key input unit 1420, and detect command of the discovery from the received event. The controller 1460 controls the Wi-Fi module 1451 to perform the device discovery in response to the command of device discovery. The controller 1460 controls the Wi-Fi module 1451 to perform the provision discovery in response to the command of the provision discovery.

The controller 1460 may select a private IP address to be transmitted from a private IP address list 1441, and control the Wi-Fi module 1451 to transmit the selected private IP address. The controller 1460 may receive the private IP address from an external device, namely, a P2P device through the Wi-Fi module 1451. As a negotiation result, when the portable terminal 1400 is determined as a GC, the controller 1460 allocates the received private IP address as an IP address of the portable terminal 1400, and operates the Wi-Fi module 1451 as a GC. As a negotiation result, when the portable terminal 1400 is determined as a GO, the controller 1460 operates the Wi-Fi module 1451 as a GO.

Meanwhile, although the structural elements can be variously changed according to convergence trend of a digital device, no elements can be listed. However, the portable terminal 1400 may further include constructions that are not mentioned such as a digital broadcasting module (e.g., DMB module), a GPS module, and a camera module. The terminal 1400 of the present disclosure may be substituted by specific constructions in the foregoing arrangements according to the provided form.

The foregoing method for allocating an Internet Protocol address of the present disclosure may be implemented in an executable program command form by various computer means and be recorded in a computer readable recording medium. In this example, the computer readable recording medium may include a program command, a data file, and a data structure individually or a combination thereof. In the meantime, the program command recorded in a recording medium may be specially designed or configured for the present disclosure or be known to a person having ordinary skill in a computer software field to be used. The computer readable recording medium includes Magnetic Media such as hard disk, floppy disk, or magnetic tape, Optical Media such as Compact Disc Read Only Memory (CD-ROM) or Digital Versatile Disc (DVD), Magneto-Optical Media such as optical disk, and a hardware device such as ROM. RAM, flash memory storing and executing program commands. Further, the program command includes a machine language code created by a complier and a high-level language code executable by a computer using an interpreter. The foregoing hardware device may be configured to be operated as at least one software module to perform an operation of the present disclosure.

The present disclosure provides a method for easily and rapidly allocating an IP address between terminals in a wireless communication network, and an apparatus thereof. The present disclosure can allocate an IP address without driving a DHCP server. Therefore, connection speed and usability between terminals are improved.

Although a method and apparatus for allocating an IP address according to exemplary embodiments of the present disclosure have been described in detail hereinabove, it should be clearly understood that many variations and modifications of the basic inventive concepts herein taught which may appear to those skilled in the present art will still fall within the spirit and scope of the present disclosure, as defined in the appended claims.

What is claimed is:

1. A method of operating a portable electronic device, the method comprising:
    determining a peer to peer communication group comprising a group owner device and one or more group client devices;
    detecting, via a short range wireless communication, at least one external electronic device that is grouped with the portable electronic device in the peer to peer communication group;
    performing, without using a dynamic host configuration protocol server, a connection based upon an internet protocol (IP) address to be used by the at least one external electronic device,
        wherein the IP address is determined from one or more IP addresses stored in a memory of the portable electronic device based at least in part on a determination that the portable electronic device is assigned as the group owner device and that the at least one external electronic device is assigned as one of the one or more group client devices; and
    transmitting, via the short range wireless communication, the IP address to the at least one external electronic device that is grouped with the portable electronic device in the peer to peer communication group before the connection is completed for exchanging content between the at least one external electronic device and the portable electronic device in the peer to peer communication group.

2. An electronic device comprising:
    communication circuitry configured to perform a short range wireless communication;
    a memory operably connected to the communication circuitry; and
    a processor operably connected to the communication circuitry and the memory, the processor configured to:
        determine a peer to peer communication group comprising a group owner device and one or more group client devices;
        detect, via the short range wireless communication, at least one external electronic device that is grouped with the electronic device in the peer to peer communication group;
        receive, from the at least one external electronic device, an internet address that is used by the electronic device as a group client device of the one or more group client devices for the peer to peer communication group; and
        transmit, as the group client device, content to the at least one external electronic device via the short range wireless communication using an internet protocol (IP) address based at least in part on a determination that the at least one external electronic device is assigned as the group owner device.

3. A portable electronic device comprising:
    communication circuitry configured to perform a short range wireless communication;
    a memory operably connected to the communication circuitry, the memory configured to store one or more internet protocol (IP) addresses; and
    a processor operably connected to the communication circuitry and the memory, the processor configured to:
        determine a peer to peer communication group comprising a group owner device and one or more group client devices;
        detect, via the short range wireless communication, at least one external electronic device that is grouped with the portable electronic device in the peer to peer communication group;
        perform, without using a dynamic host configuration protocol server, a connection based upon an IP address to be used by the at least one external electronic device, wherein the IP address is determined from the one or more IP addresses based at least in part on a determination that the portable electronic device is assigned as the group owner device and that the at least one external electronic device is assigned as one of the one or more group client devices; and
        transmit, via the short range wireless communication, the IP address to the at least one external electronic device that is grouped with the portable electronic device in the peer to peer communication group before the connection is completed for exchanging content between the at least one external electronic device and the portable electronic device in the peer to peer communication group.

4. The method of claim 1, wherein performing the connection further comprises allocating the one or more IP addresses corresponding to one of the one or more group client devices including the at least one external electronic device based at least in part on the determination that the portable electronic device is assigned as the group owner device.

5. The method of claim 1, wherein the IP address is valid while the at least one external electronic device is grouped in the peer to peer communication group.

6. The method of claim 1, wherein transmitting the IP address further comprises transmitting a data frame including a vendor specific portion that includes the IP address and information associated with at least one of a vendor of the portable electronic device or the at least one external electronic device.

7. The electronic device of claim 2, wherein the IP address is determined from one or more IP addresses stored in the memory of the at least one external electronic device.

8. The electronic device of claim 2, wherein the processor is further configured to receive the IP address from the at least one external electronic device as at least part of a formation of the peer to peer communication group.

9. The electronic device of claim 2, wherein the processor is further configured to perform a connection with the at least one external electronic device via the short range wireless communication based at least in part on a detection of the at least one external electronic device.

10. The electronic device of claim 9, wherein the processor is further configured to complete the connection after receiving the IP address from the at least one external electronic device.

11. The electronic device of claim 10, wherein the processor is further configured to transmit the content after completion of the connection.

12. The portable electronic device of claim 3, further comprising a display;

wherein the processor is further configured to display, as at least part of the detection, an indication indicative of the at least one external electronic device via the display.

13. The portable electronic device of claim 12, wherein the processor is further configured to perform the connection with the at least one external electronic device using the short range wireless communication based at least in part on a user input received in relation with the indication.

14. The portable electronic device of claim 3, wherein the processor is further configured to broadcast, as at least part of the detection, a beacon to scan one or more external electronic devices including the at least one external electronic device based at least in part on the determination that the portable electronic device is assigned as the group owner device.

15. The portable electronic device of claim 3, wherein:
the one or more IP addresses comprise a first IP address and a second IP address,
the at least one external electronic device comprises a first external electronic device and a second external electronic device, and
the processor is further configured to allocate the first IP address to the first external electronic device and the second IP address to the second external electronic device, respectively, based at least in part on the determination that the portable electronic device is assigned as the group owner device.

16. The portable electronic device of claim 3, wherein the group owner device and the one or more group client devices are determined by the portable electronic device.

17. The portable electronic device of claim 3, wherein the memory is further configured to store a first value representing a first power associated with the portable electronic device, and wherein the processor is further configured to:
receive a second value representing a second power associated with the at least one external electronic device; and
assign the portable electronic device as the group owner device based at least in part on a determination that the first value is greater than the second value.

18. The portable electronic device of claim 13, wherein the processor is configured to complete the connection with the at least one external electronic device after transmitting the IP address to the at least one external electronic device.

19. The portable electronic device of claim 18, wherein the processor is further configured to receive the content from the at least one external electronic device after completion of the connection.

20. The portable electronic device of claim 3, wherein the processor is further configured to transmit the IP address using a data frame including information associated with at least one of a vendor of the portable electronic device or the at least one external electronic device.

* * * * *